(12) United States Patent
Rapaport et al.

(10) Patent No.: US 7,817,701 B2
(45) Date of Patent: Oct. 19, 2010

(54) ACTIVE ELEMENT FOR LASER SOURCE AND LASER SOURCE INCLUDING SUCH AN ACTIVE ELEMENT

(75) Inventors: Alexandra Rapaport, Cassis (FR); Luc Nguyen, Antony (FR); Jean-Eucher Montagne, Orleans (FR)

(73) Assignee: Compagnie Industrielle des Lasers Cilas, Orleans (FR)

( * ) Notice: Subject to any disclaimer, the term of this patent is extended or adjusted under 35 U.S.C. 154(b) by 65 days.

(21) Appl. No.: 12/127,463

(22) Filed: May 27, 2008

(65) Prior Publication Data

US 2009/0052493 A1   Feb. 26, 2009

(30) Foreign Application Priority Data

Jun. 12, 2007   (FR)   ................... 07 04168

(51) Int. Cl.
*H01S 3/091* (2006.01)
(52) U.S. Cl. ............................. 372/75; 372/71; 372/97
(58) Field of Classification Search .................. 372/40, 372/41, 66–68, 70–75
See application file for complete search history.

(56) References Cited

U.S. PATENT DOCUMENTS

| 4,555,786 A | * | 11/1985 | Byer | ............................ | 372/70 |
| 7,039,085 B2 | * | 5/2006 | Kunitsugu et al. | ....... | 372/49.01 |
| 2001/0019570 A1 | | 9/2001 | Cabaret | | |
| 2002/0057725 A1 | * | 5/2002 | Peressini | ...................... | 372/92 |
| 2002/0118718 A1 | * | 8/2002 | Honea et al. | .................. | 372/71 |
| 2003/0021324 A1 | | 1/2003 | Filgas | | |
| 2003/0138021 A1 | * | 7/2003 | Hodgson et al. | .............. | 372/75 |
| 2005/0018743 A1 | | 1/2005 | Volodin | | |

FOREIGN PATENT DOCUMENTS

| EP | 1 115 186 | 7/2001 |
| FR | 1 490 528 | 8/1967 |
| FR | 2 885 267 | 11/2006 |

OTHER PUBLICATIONS

P. Perez-Milan et al., "Active Q-Switched Distributed Feedback Erbium-doped Fiber Lasers," Applied Physics Letters, AIP, American Institute of Physics, vol. 87, No. 1, Jun. 28, 2005, pp. 11104-1 to 11104-3.

(Continued)

*Primary Examiner*—Armando Rodriguez
*Assistant Examiner*—Xnning Niu
(74) *Attorney, Agent, or Firm*—Dickinson Wright PLLC

(57) ABSTRACT

An active element for a laser source, the active element comprising an elongated bar with a reflective lateral surface, doped to be able to absorb at least a pumping beam being propagated at least approximately longitudinally in the bar in order to amplify at least a laser radiation also being propagated longitudinally; and a jacket in contact with the lateral surface of the bar and presenting a refractive index smaller than that of the bar, in the reflective lateral surface of the bar, there is at least one dull-ground diffusing zone able to interrupt the paths of spurious laser modes being propagated in the bar by total internal reflections on the lateral surface.

15 Claims, 3 Drawing Sheets

OTHER PUBLICATIONS

A. Imenkov et al., "The Spectral Linewidth of Tunable Semiconductor INASB/INASSBP Lasers Emitting at 3.2-3.6 MUM (2800-3100 CM-1)," Review of Scientific Instruments, AIP, vol. 72, No. 4, Apr. 2001, pp. 1988-1992.

European Office Action dated Jan. 27, 2010, including dictionary excerpts.

D. C. Brown, et al., "Parasitic oscillations and amplified spontaneous emission in face-pumped total internal reflection lasers," SPIE—The International Society for Optical Engineering—New Slab and Solid-State Laser Technologies and Applications, vol. 736, XP000654815, 1987, pp. 74-83.

J. M. McMahon, et al., "A Glass-Disk-Laser Amplifier," IEEE Journal of Quantum Electronics, vol. QE-9, No. 10, Oct. 1973, pp. 992-999.

* cited by examiner

ACTIVE ELEMENT FOR LASER SOURCE AND LASER SOURCE INCLUDING SUCH AN ACTIVE ELEMENT

TECHNICAL FIELD OF THE INVENTION

The present invention relates to an active element for a laser source, and a laser source including such an active element.

BACKGROUND OF THE INVENTION

More specifically, said laser source is of the type comprising:
- an active element comprising an elongated bar, of generally circular, but not exclusively circular, transverse section, comprising a doped matrix able to absorb a pumping beam being propagated longitudinally to amplify a laser radiation also being propagated longitudinally;
- a pumping system, comprising pumping (laser) diodes able to emit said longitudinal pumping beam;
- an optical transport system for directing the pumping beam emitted by said pumping system in said active element so as to obtain a longitudinal pumping; and
- an optical cavity making it possible to extract said laser radiation.

It is known that, to be effective, the pumping beam must be spectrally tuned to the absorption spectrum of the active element so that said pumping beam is absorbed and transfers its energy to the ion (rare earth or transition metal for example) doping said active element.

It is also known that the pumping (laser) diodes present an emission spectrum, normally a few nanometers wide, which is offset by 0.25 to 0.3 nanometers per degree Celsius, when the temperature of said pumping diodes is varied.

To ensure a satisfactory conformity of the wavelength of the pumping beam (obtained from said pumping diodes) with the absorption spectrum of the active medium, the art of mounting said diodes on Peltier modules is known, the function of which is to stabilize their temperature to better than 0.5° C., such that a centering of the wavelength is ensured to at least 0.2 nm.

However, notably in the context of military applications, the parameters of compactness, energy consumption and speed of deployment are of particular importance. Thus, the use of Peltier modules, which induces a high energy consumption and which necessitates a stabilization time of around one minute, represents a brake on the use of diode-pumped laser sources in compact systems. The same applies for other active diode temperature stabilization systems. Thus, the technology still used today, for example for terrestrial laser designators, is a flash pumping technology, which is not very cost effective and bulky.

To try to overcome this problem, it is therefore appropriate:
- either to increase the tolerance of the active element to the wavelength drift, which is proposed for example by patent FR-2 803 697, for which the pumping beam is guided to pass several times through the active element;
- or to apply a passive stabilization of the pumping diode emission wavelength, as proposed, for example, in the patent application US-2005/0018743 which describes the use of a system including one or more Volume Bragg Gratings (VBG) in order to condition one or more laser emission characteristics.

However, the above solutions only make it possible to obtain an insensitivity of 3 to 10 nanometers corresponding to a diode temperature drift of 15 to 40° C. Such a range of thermal insensitivity falls far short of what is needed to use the pumping system, for example in a terrestrial laser designator, between −40° C. and +70° C.

The object of the present invention is to provide an active element and a laser source making it possible to obtain a thermal insensitivity of the laser emission over more than 15 nanometers.

It is known that the proportion of pumping energy absorbed by the active element depends, on the one hand, on the absorption coefficient $\alpha(\lambda)$ of the active element and, on the other hand, on the length of material L passed through by the pumping beam. This absorbed energy proportion Abs satisfies the relation $Abs(\lambda)=1-\exp[-\alpha(\lambda)L]$ in the case of a uniform material or $Abs(\lambda)=1-\exp[-\alpha 1(\lambda)L1-\alpha 2(\lambda)L2-\ldots \alpha n(\lambda)Ln]$ in the case of a material made up of n zones of absorption $\alpha i(\lambda)$ and of length Li and $Abs(\lambda)=1-\exp[-\int \alpha(\lambda,z)dz]$ in the most general case where the doping and the absorption vary in the bar according to the longitudinal position z, $\lambda$ designating the wavelength of the laser emission. Thus, to optimize said proportion Abs, it is appropriate to maximize, on the one hand, said absorption coefficient $\alpha$ for all the interesting wavelengths and, on the other hand, said length passed through by the pumping beam. In order for the proportion Abs to always remain greater than approximately 80-90% for all of the targeted spectral range, the absorption length must be adapted to the lowest coefficient.

It is known, moreover, that it is difficult to adequately extract the energy from a large volume of active element, in which the pumping energy would be dispersed. Thus, it is advantageous to set up a longitudinal pumping configuration, for which the absorption length of the pumping beam can be long, provided that the latter is colinear (or almost colinear) to the axis of the laser source. The active element is therefore then suitable for receiving and conveying a pumping radiation being propagated colinearly (or almost colinearly) to the axis of the laser source.

The main difficulty with longitudinal pumping at high power levels (greater than 500 W), if it is a triggered laser that is required, lies in the production of spurious effects, such as a spontaneous emission amplification (ASE amplification hereinbelow) or spurious emission modes (MEP modes hereinbelow). The ASE amplification comes from a spontaneous radiation, naturally emitted by the ions excited by the pumping beam and amplified by the gain resulting from the presence of these excited ions. As for the MEP modes, they come from the combination:
- of reflections present at the edges of the active element and/or on any other reflector; and
- of the laser gain originating from the excited ions.

The combination of these two factors generates a spurious laser emission along one or more axes which are usually different from the main laser axis.

The ASE amplification is a parameter governed mainly by the gain and the maximum possible gain length in the active element. The only way to reduce its effect is to limit the gain length or the gain value.

Furthermore, the MEP modes are governed by the gain and the presence of spurious reflections which return photons to the laser so allowing gain cycling of these photons.

SUMMARY OF THE INVENTION

The object of the present invention is to remedy these drawbacks. It relates to an active element for a laser source, making it possible to obtain a high thermal insensitivity, while limiting the generation of spurious effects of the above-mentioned type (ASE amplification and MEP modes).

To this end, according to the invention, the active element for a laser source, comprising:

- an elongated bar with reflective lateral surface, doped to be able to absorb at least a pumping beam being propagated at least approximately longitudinally in said bar in order to amplify at least a laser radiation also being propagated longitudinally; and
- a jacket in contact with said lateral surface of said bar and presenting a refractive index smaller than that of said bar, is noteworthy in that:

- in said reflective lateral surface of said bar, there is at least one dull-ground diffusing zone able to interrupt the paths of spurious laser modes being propagated in said bar by total internal reflections on said lateral surface;
- said jacket is able to reflect at least 80% of said pumping beam in said bar; and
- the length and the doping of said bar are such that the fraction of the energy of said pumping beam, absorbed by said bar, is at least equal to 80%.

Thus, thanks to the present invention, it is possible to obtain a particularly effective pumping over a spectral band of more than twenty or so nanometers, and a very substantial, if not total, suppression of the spurious radiations which tend to develop in said bar, which makes it possible to prohibit the MEP modes and minimize the ASE amplification length. Said dull-ground zone must prevent any specular reflection and it can be obtained by any known means, such as abrasion, chemical attack, ultrasound, sandblasting, ribbing, etc.

The total extent of said dull-ground diffusing zone on the lateral surface of said bar is at least approximately between 5% and 40% of the lateral surface of said bar.

To explain the way the MEP modes are eliminated by said dull-ground diffusing zone, take the example of a cylindrical bar in which 2D MEP modes (two-dimensional MEP modes) and 3D MEP modes (three-dimensional MEP modes) can be distinguished.

The 2D MEP modes develop in a section of the bar along paths that are polygonal in form, each peak of the polygon constituting a ricochet on the periphery of the bar. The lower the index of the jacket, the greater the number of existing polygonal 2D MEPs. For example, for a bar of YAG($n=1.82$) placed in air ($n=1$), the square 2D MEP exists in total reflection mode, as do all the higher order polygonal 2D MEPs (pentagons, hexagons, and so on). The closer the index of the jacket is to that of the bar, the more oblique is the incidence of the 2D MEPs on the face of the bar to retain a high reflection coefficient. For a given index of the jacket, the 2D MEP modes have a reflection limit angle below which they suffer too much loss to exist. Together with this angle, there is a size of the determined side of the polygonal MEP. If a dull-ground diffusing zone is produced over a fraction of the periphery that is greater than this determined size of this side, then the 2D MEPs existing in this section are suppressed.

The 3D MEP modes also develop in a polygonal form which ricochets on the internal periphery of the bar, if we look at their trace in a section of the bar, but they also have a longitudinal propagation which causes them also to ricochet on the extreme faces of said bar. Their path appears like a segmented spiral. The existence of such 3D MEP modes depends on their incidence on the extreme faces, on their incidence on the periphery and on the index of the jacket. In order to suppress such 3D MEP modes, one solution is to have the dull-ground diffusing zone at the periphery of the bar over a length such that the pitch of the 3D MEP mode straddling this zone has an incidence on the extreme face such that the reflection loss prevents it from existing.

In the above, it will easily be understood that a part of the dull-ground diffusing zone, of annular form around said bar, can eliminate the 3D MEP modes that develop spirally. In practice, because of this annular part of the dull-ground diffusing zone, the 3D MEP modes can neither travel all along the bar, nor reach the ends of the latter to be reflected on the extreme faces. For reasons of effectiveness, the longitudinal extent of said annular part of the dull-ground diffusing zone must be at least equal to the diameter of the bar.

To prevent said annular part of the dull-ground diffusing zone from hampering the propagation of the pumping beam, it is preferably positioned in a portion of the bar in which only a weak pumping beam flux passes. For example:

- if a pumping beam is addressed to said bar by just one of its longitudinal end faces, said annular part of the dull-ground diffusing zone is positioned in the vicinity of the other of said longitudinal end faces of the bar;
- if a pumping beam is addressed to said bar by each of its longitudinal end faces, said annular part of the dull-ground diffusing zone is positioned in the vicinity of the median part of the bar.

In these cases, the longitudinal extent of said annular part of the dull-ground zone can be very much greater than the diameter of the bar.

It will be noted that such an annular part of the dull-ground diffusing zone cannot eliminate all the 2D MEP modes being propagated in sections of the bar and cannot therefore be satisfactory with regard to the elimination of the latter other than in particular cases, such as, for example, low gain, refractive index of the jacket means close to the refractive index of the bar, and so on.

Also, in order to eliminate the 2D MEP modes in a sure way, said dull-ground diffusing zone also includes at least a part in strip form, the general direction of which is at least approximately longitudinal relative to said bar, able to interrupt the spurious laser paths looped inside the latter. Such a part in strip form can follow a generatrix of said bar, be spirally wound around the latter, comprise a plurality of individual segments positioned on different generatrices of the bar, and so on. If necessary, this part in strip form can be provided only in highly doped zones of the bar.

The width of the part in strip form of said dull-ground diffusing zone must be greater than the distance separating two consecutive internal reflections of the lower order 2D MEP mode, inside said bar. This width is determined easily by calculation based on the incidence relative to the lateral surface and the refractive indices of the bar and of the jacket. For example, for a bar made of YAG:Nd, with an index equal to 1.82, and a jacket with an index equal to 1.65, it is determined that said lower order is equal to 8. The width of said strip must therefore be equal to ⅛ of the lateral surface of the bar.

Preferably, said jacket is formed by a fluid film and, for thermal transmission reasons, its thickness is no more than 500 μm. This film can be liquid (polyphenyl ether), or consist of a glue, a gel or a grease (translucent thermal grease or translucent vacuum grease). Advantageously, this jacket is absorbent to at least one of the radiations emitted by the bar.

Also advantageously, beyond this jacket, the mechanical aspect, including both the jacket and the active element (bar), can be absorbent for laser radiations in order to minimize the spurious effects. To this end, a black anodization of the interior of the channel containing the bar and the jacket is preferable.

The present invention also relates to a laser source comprising:
- an active element for a laser source;
- a pumping system provided with pumping laser diodes which can emit at least one pumping beam;
- an optical transport system for directing the pumping beam emitted by said laser diodes in said active element so as to obtain a longitudinal pumping; and
- an optical cavity making it possible to extract at least one laser radiation.

According to the invention, said laser source is noteworthy in that said active element is of the abovementioned type.

Advantageously, said pumping system is formed in such a way as to generate a pumping beam:
- which comprises a stability of the deposited energy more than 20% stable over several tens of degrees; and/or
- which is contained within a predetermined solid angle relative to said bar.

In a particular embodiment, said pumping system comprises diode modules (or stacks), formed of semiconductors obtained from different wafers. The sum of the spectral emissions of the different semiconductors thus generates a wider spectrum than that of a single diode. Furthermore, advantageously, each diode module comprises a cooling means, which makes it possible to obtain a specific thermal situation and an equally spread spectrum operation.

Moreover, advantageously, said laser source can also include means for generating at least a double passage of the pumping beam in the active element.

Said pumping system can consist of two blocks, each adding a pumping radiation by each of the two ends of the bar, in order to more uniformly distribute the energy deposit over the length of the bar and so reduce the propensity for MEP modes and ASE amplification to develop in the input planes of the bar.

BRIEF DESCRIPTION OF THE DRAWINGS

The figures of the appended drawing will clearly show how the invention can be produced. In these figures, identical references denote similar elements.

DETAILED DESCRIPTION OF THE INVENTION

Figure 1:
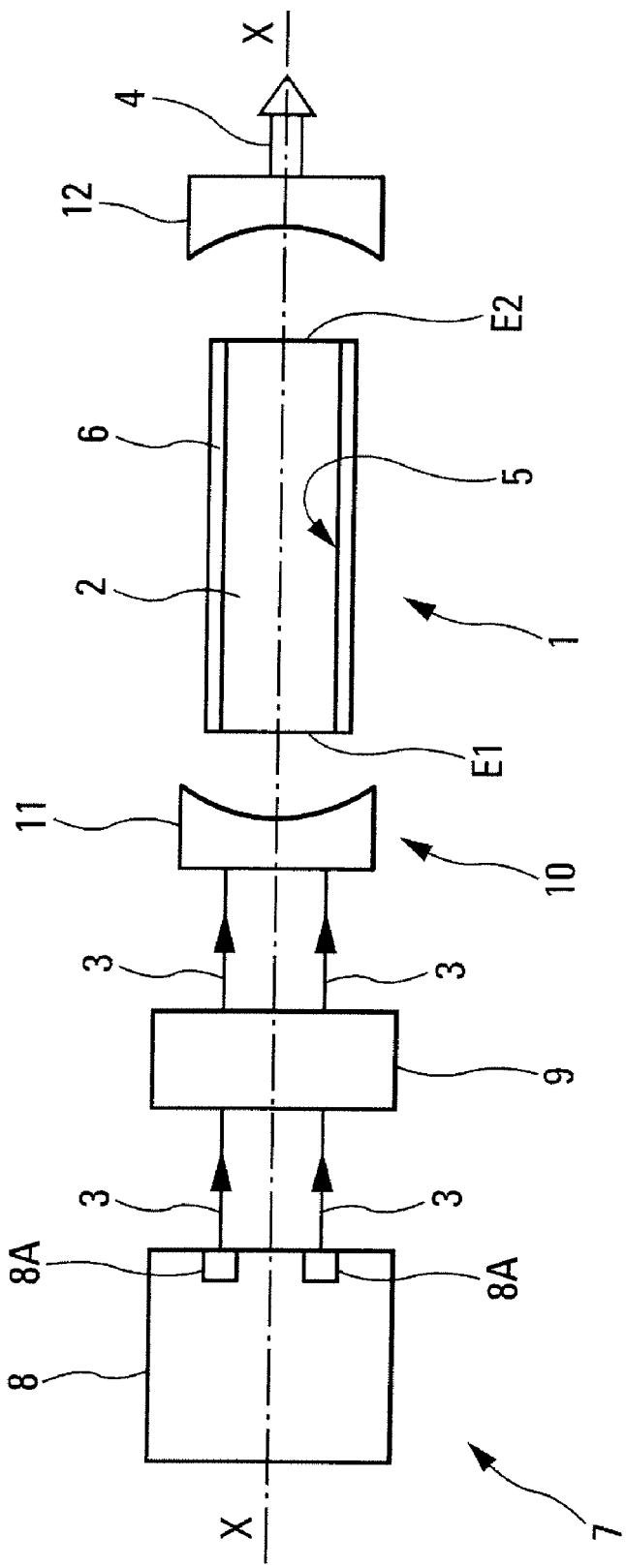
FIG. 1 is a block diagram of a known laser source.

The active element 1, of known type and diagrammatically represented in FIG. 1, comprises an elongated bar 2 which comprises a doped matrix able to absorb a pumping beam 3, to amplify at least one laser radiation 4 being longitudinally propagated along an axis X-X. The lateral surface 5 of the bar 2 is polished (therefore reflective) and covered by a jacket 6 having a refractive index smaller than that of said bar. Thus, the pumping beam 3 can be kept in the bar 2 thanks to total internal reflections on said lateral surface 5.

This active element 1 can be incorporated in a laser source 7 such as is represented by way of example in FIG. 1.

Said laser source 7 usually comprises, in addition to said active element 1:
- a usual pumping system 8, which comprises laser-type pumping diodes 8A and which can emit at least one pumping beam 3;
- a usual optical transport system 9, for directing the pumping beam 3 emitted by said pumping system 8 in said active element 1 so as to obtain a longitudinal pumping, through an end face E1 of said bar 2; and
- a usual optical cavity 10, of axis X-X, notably comprising a reflective mirror 11 and a partially transparent mirror 12, which are placed facing one another. This optical cavity 10 gives the laser radiation 4, obtained by laser amplification and emitted through said mirror 12 along the axis X-X, its directivity and geometrical characteristics. Said optical cavity can also contain usual triggering means (QSwitch), not represented in FIG. 1, of the electro-optical or acousto-optical type, for example.

Figure 2:
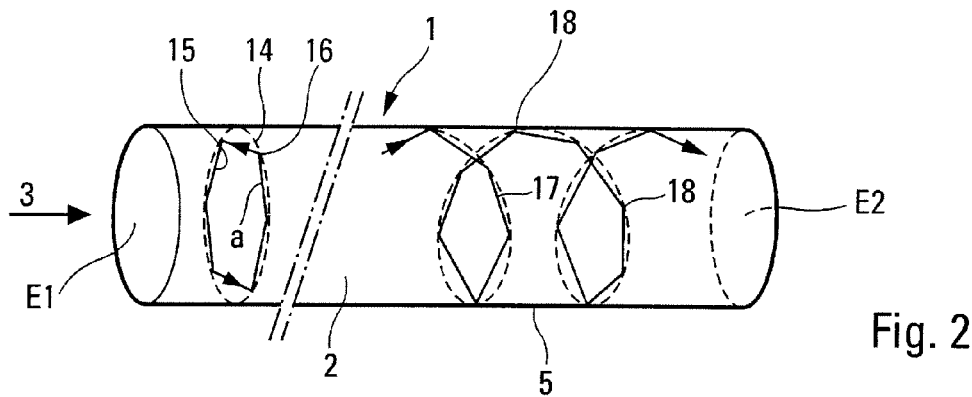
FIG. 2 diagrammatically illustrates the two- and three-dimensional spurious laser emission modes inside the active element of the laser source of FIG. 1.

As diagrammatically illustrated in FIG. 2, in operation, the bar 2 (represented without its jacket 6) is the source of spurious laser emissions. According to a first mode, called 2D MEP mode (see above), these spurious laser emissions develop in sections 14 of the bar 2 along paths in polygonal form 15, each summit 16 of a polygon 15 constituting a ricochet by internal reflection on the lateral surface 5. According to another mode, called 3D MEP mode (see above), these spurious laser emissions follow segmented spirals 17 being longitudinally propagated in said bar 2, with ricochet points 18 by internal reflection on the lateral surface 5.

Figure 3:
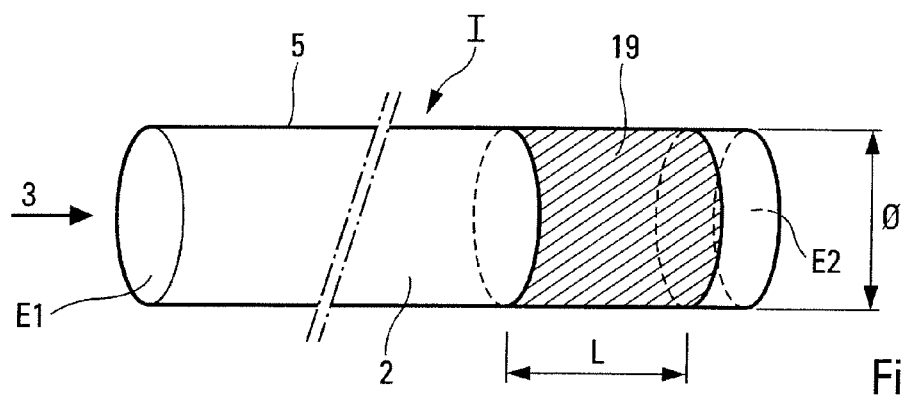
FIGS. 3, 4 and 5 diagrammatically illustrate three examples of active element according to the present invention.

According to an important feature of the present invention, in order to eliminate such spurious 3D MEP modes, the lateral surface 5 is dull-ground over an annular zone 19 surrounding said bar 2, as in the active element 1 shown by way of example (without jacket 6) in FIG. 3. The dull-ground annular zone 19 of the lateral surface 5 is therefore diffusive and eliminates the ricochet points 18. Good results are obtained in eliminating 3D MEP modes when the longitudinal extent L of the diffusing annular zone 19 is at least equal to the diameter $\phi$ of the bar 2.

As indicated above, the diffusing annular zone 19 is preferably positioned in a portion of the bar in which only a weak flux of the pumping beam 3 passes. Also, in the example of FIG. 3, where it is assumed that, as in the laser source 7 of FIG. 1, the pumping beam 3 is addressed to the bar 3 through only the end face E1 of the latter, said diffusing annular zone 19 is positioned in the vicinity of the other end face E2 of said bar 2.

Figure 4:
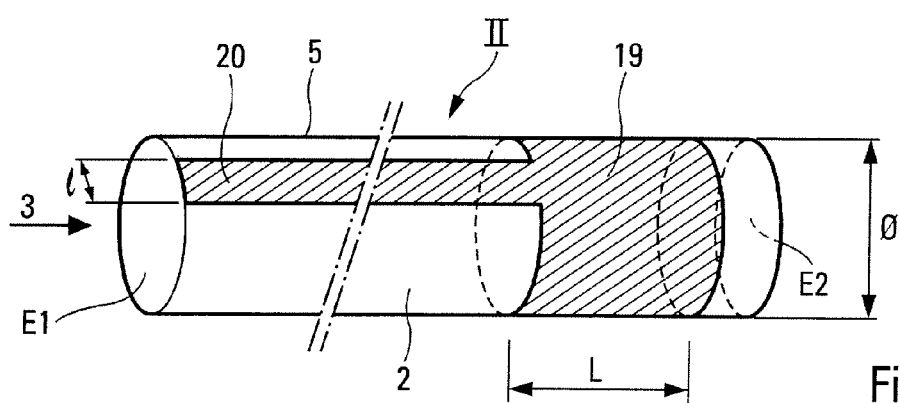

Moreover, in order to eliminate the spurious 2D MEP modes, according to another feature of the present invention—see embodiment II of FIG. 4—the lateral surface 5 of the bar 2 is dull-ground over a strip portion 20, with a direction generally at least approximately longitudinal in relation to the latter. The width l of said diffusing strip portion 20 obtained in this way is at least equal to the length a (see FIG. 2) of one side of the polygon 15 corresponding to the lower order 2D MEP mode. Although represented as rectilinear and in a single piece in FIG. 4, said strip portion 20 could be discontinuous and/or take any desired form (helix for example).

Figure 5:
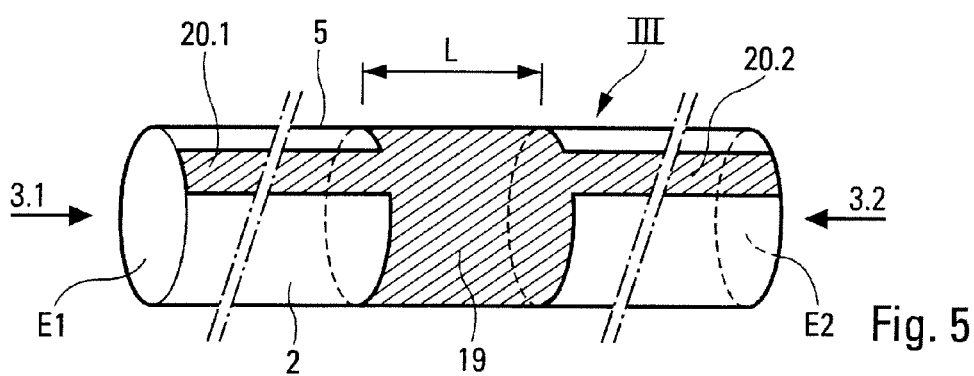

In the embodiment variant III of the active element according to the present invention, represented in FIG. 5, the bar 2 is pumped through each of its end faces E1 and E2, respectively by pumping beams 3.1 and 3.2. In this case, the diffusing annular zone 19 is advantageously positioned in the median part of said bar 2 (where only a weak pumping flux passes)

and a strip portion 20.1, 20.2 (similar to the strip portion 20) can be provided either side of said median diffusing annular zone 19.

Whatever its configuration, the diffusing zone 19, 20, 20.1, 20.2 extends on said bar 2 over a fraction of said lateral surface 5 of the latter, at least approximately between 5% and 40%.

Moreover, the jacket 6 in contact with the lateral surface 5 of the bar 2 is chosen to be able to reflect at least 80% of the pumping beam 3 in the bar 2. Of course, this jacket 6 must present a refractive index lower than that of the bar 2 and be not very absorbent to the pumping beam 3, 3.1, 3.2, so that the total reflection at its interface with the bar 2 is performed with maximum effectiveness. On the other hand, said jacket 6 can preferably be absorbent to laser radiations.

Such a jacket is advantageously formed by a fluid film. It can, for example, consist of a glue which provides a thermal and mechanical junction between the bar and the mount (not shown) which surrounds it, without this glue necessarily having pronounced adhesion characteristics. This peripheral jacket 6 can also consist of an index liquid, a gel or a grease. For the thermal transfer function between the bar and its mount to be good, a jacket thickness less than 500 µm is preferred.

Moreover, the length and the doping of the bar 2 are such that the fraction of the energy of the pumping beam 3, absorbed by the bar 2, is at least equal to 80% over a spectral range greater than 15 nanometers. The bar 2 can present a longitudinal doping variation, along the axis X-X, with the lowest doping which is limited to a predetermined value, for example 0.1%, at the level of the end face or faces E1, E2 where the pumping beam 3.1, 3.2 enters the active element 1.

Thus, by limiting the doping at the input(s) of the bar 2, the absorption, and therefore the transverse gain, is limited in this zone, which makes it possible to reduce the occurrence of both an ASE amplification and MEP modes. The material of the bar 2 must in particular respect this criterion when the pumping wavelength is located at the absorption maximum of said material.

The lower doping at the input(s) of the bar 2 reduces the absorption effectiveness, particularly when the pumping wavelength is located at the absorption minimum of said material in the spectral band concerned. It is therefore important to provide, beyond a predetermined distance, for example a few millimeters forward of the input face or faces E1, E2, a higher doping level.

The material of the bar 2 can present a continuous longitudinal doping variation, or a staged longitudinal doping variation.

In the first case, said material is preferably a material with doping gradient. Such materials can be produced by ceramic method.

It is also possible to use several progressive doping crystals to achieve at the input of each of the latter the maximum startup gain of the ASE amplification.

For bars consisting of a single doping and of a single matrix or of several different dopings and/or several difference matrices, in order to obtain an insensitivity to the wavelength variation of the diodes, the material has a doping and a length such that, with a longitudinal pumping, the absorbed fraction Abs for the least absorbent wavelength of the operating spectral band is greater than approximately 90%.

In the case of a uniform material, $Abs=1-\exp[-\alpha(\lambda)L] >90\%$, or $\alpha(\lambda)L>2.3$, therefore applies.

Figure 6:
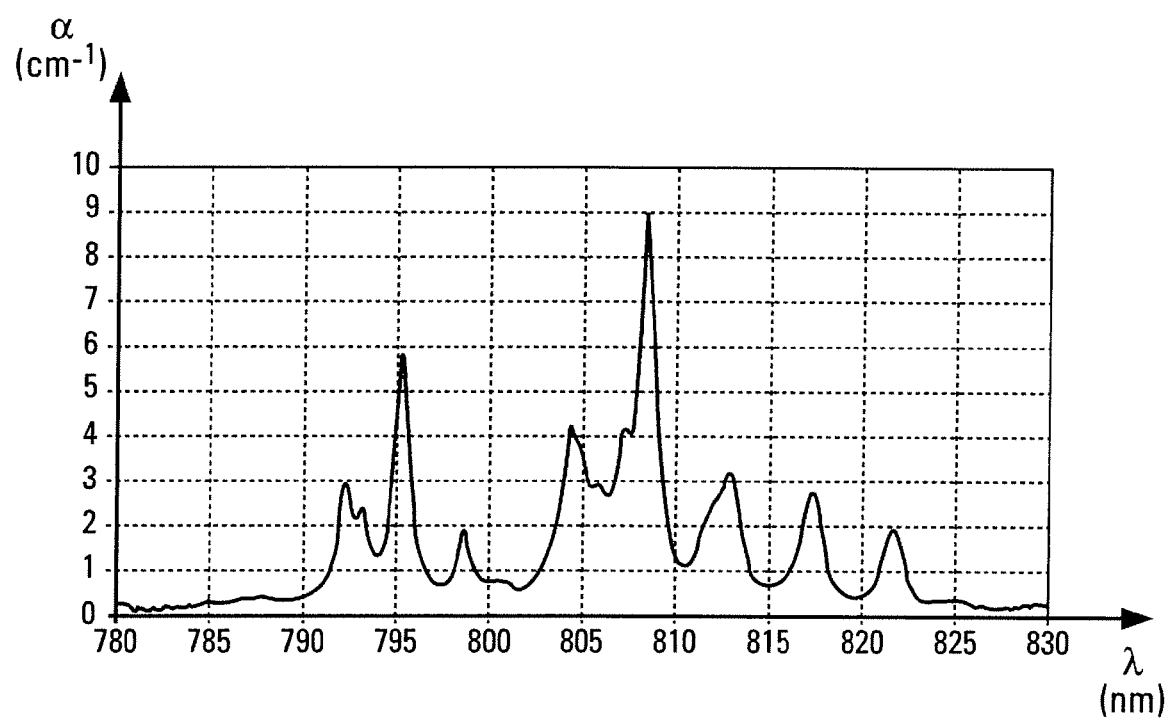
FIG. 6 is a diagram of the absorption spectrum of a 1% Neodyme-doped YAG material, the X axis representing the wavelengths $\lambda$ (in nm) and the Y axis indicating the absorption coefficient $\alpha$ (in $cm^{-1}$).

In the example represented as an example in FIG. 6, of a 1% Neodyme-doped YAG where $\alpha(\lambda=802\ nm)=0.6\ cm^{-1}$ at the absorption minimum, the length of doped material must be greater than $2.3/\alpha(\lambda)$, that is, greater than 3.8 cm.

Moreover, in a preferred embodiment, said pumping system 8 comprises diode modules (or stacks) 8A, made up of semiconductors obtained from different wafers. The sum of the spectral emissions of the different semiconductors thus generates a wider spectrum than that of a single diode. Furthermore, preferably, each diode module 8A includes an individual cooling means (not represented), which makes it possible to obtain an equally spread spectrum operation.

Furthermore, in a particular embodiment, said pumping system 8 is constructed in such a way as to generate a pumping beam 3 which has a stability of the deposited energy that is more than 20% stable over several tens of degrees.

Moreover, said laser source 8 also comprises means (not represented) for generating at least a double passage of the pumping beam 3 in the active element 1.

The pumping diodes 8A may not be actively cooled, but dissipate their energy, during a time-limited sequence, in an integral structure, the temperature rise of which will limit their own temperature rise. The starting temperature and this temperature rise can be such that their emission wavelength, throughout the sequence, remains within the operating spectral band so that, despite a temperature that may be low at the start of the sequence, and a drift of this temperature over time, the laser retains a fairly stable operation during the sequence without using active temperature-stabilizing means.

The invention claimed is:

1. An active element for a laser source, comprising:
   an elongated bar with reflective lateral surface, doped to be able to absorb at least a pumping beam being propagated at least approximately longitudinally in said bar in order to amplify at least a laser radiation also being propagated longitudinally, said bar in operation being the source of spurious laser emissions; and
   a jacket in contact with said lateral surface of said bar and presenting a refractive index smaller than that of said bar, wherein:
   in said reflective lateral surface of said bar, in a portion of said bar in which only a weak pumping beam flux passes, there is at least one dull-ground diffusing zone able to interrupt the paths of spurious laser modes being propagated in said bar by total internal reflections on said lateral surface;
   said jacket is able to reflect at least 80% of said pumping beam in said bar; and
   the length and the doping of said bar are such that the fraction of the energy of said pumping beam, absorbed by said bar, is at least equal to 80%.

2. The active element as claimed in claim 1, wherein the fraction of the pumping energy that is absorbed is greater than 80% over a spectral range greater than 15 nanometers.

3. The active element as claimed in claim 1, wherein the total extent of said dull-ground diffusing zone on said bar is at least approximately between 5% and 40% of the lateral surface of said bar.

4. The active element as claimed in claim 1, wherein said dull-ground diffusing zone includes at least one part of annular form surrounding said bar.

5. The active element as claimed in claim 4, wherein the longitudinal extent of said annular part of the dull-ground diffusing zone is at least equal to the diameter of said bar.

6. The active element as claimed in claim 4, wherein said annular part of the dull-ground diffusing zone is positioned in a portion of the bar in which only a weak pumping beam flux passes.

7. The active element as claimed in claim 6, in which a pumping beam is addressed to said bar by just one of the longitudinal end faces of the latter, wherein said annular part of the dull-ground diffusing zone is positioned in the vicinity of the other of said longitudinal end faces of said bar.

8. The active element as claimed in claim 6, in which a pumping beam is addressed to said bar by each of the longitudinal end faces of the latter, wherein said annular part of the dull-ground diffusing zone is positioned in the vicinity of the median part of said bar.

9. The active element as claimed in claim 4, wherein said dull-ground diffusing zone also includes at least a part in strip form, of a general direction at least approximately longitudinal in relation to said bar, able to interrupt the spurious laser paths looped inside the latter.

10. The active element as claimed in claim 9, wherein said part in strip form is made up of individual segments, arranged on different generatrices of said bar.

11. The active element as claimed in claim 9, wherein said part in strip form is wound spirally over the length of said bar.

12. The active element as claimed in claim 1, wherein said jacket is formed by a fluid film, the thickness of which is no more than 500 µm.

13. The active element as claimed in claim 12, wherein said jacket is absorbent to laser radiations.

14. A laser source comprising:
an active element for a laser source;
a pumping system provided with pumping laser diodes which can emit at least one pumping beam;
an optical transport system for directing the pumping beam emitted by said laser diodes in said active element so as to obtain a longitudinal pumping; and
an optical cavity making it possible to extract at least one laser radiation, wherein said active element is as specified under claim 1.

15. The laser source as claimed in claim 14, wherein said pumping system comprises diode modules, formed by semiconductors obtained from different wafers.

* * * * *